United States Patent [19]

Clark

[11] 4,215,872
[45] Aug. 5, 1980

[54] POSITIVE SHIFT DERAILLEUR MECHANISM

[76] Inventor: Marion A. Clark, 1683 Cheryl La., Tulare, Calif. 93274

[21] Appl. No.: 10,039

[22] Filed: Feb. 7, 1979

[51] Int. Cl.³ .......................... B62M 9/12; F16H 9/00
[52] U.S. Cl. ...................................... 280/236; 474/80; 474/129
[58] Field of Search ................. 280/236, 237, 238; 74/217 B, 242

[56] References Cited

U.S. PATENT DOCUMENTS

| 2,108,941 | 2/1938 | Morgan | 74/217 B |
| 2,428,166 | 9/1947 | LeTourneur | 74/217 B |
| 2,431,513 | 11/1947 | Schwinn | 74/217 B |
| 3,863,512 | 2/1975 | Crawley | 74/217 B |
| 3,965,763 | 6/1976 | Wechsler | 280/236 |
| 4,023,424 | 5/1977 | Ryan et al. | 74/217 B |

Primary Examiner—John J. Love
Assistant Examiner—Donn McGiehan
Attorney, Agent, or Firm—Brown & Martin

[57] ABSTRACT

A derailleur gear shift mechanism for a bicycle, in which the drive chain transfer unit for moving the chain to selected gears is operated by a rigid push-pull rod actuating linkage. An actuating lever, accessibly mounted on the bicycle frame, is indexed to specific positions at which the linkage holds the chain transfer unit in accurate alignment with individual rear wheel drive sprockets. The mechanism is adaptable to many existing derailleur gear assemblies.

1 Claim, 4 Drawing Figures

POSITIVE SHIFT DERAILLEUR MECHANISM

BACKGROUND OF THE INVENTION

In the conventional type of derailleur gear shift mechanism on a bicycle, the rear wheel carries a stack of sprockets of different sizes. The drive chain from the pedal driven sprocket is engaged selectively with the rear wheel sprockets to provide the required gear ratio. The chain is held adjacent the rear sprockets on a shift carriage, which is moved laterally to transfer the chain from one sprocket to another as the sprockets rotate. A spring loaded idler sprocket on the shift carriage maintains tension in the chain to compensate for the different path lengths of the chain around the various sprockets.

The shift carriage is moved in one direction by a tension cable and is returned by a spring, the cable being connected to a shift lever on the upper front portion of the bicycle frame. In most installations there is no positive positioning means for the shift lever and shifting is done mostly by feel as the drive ratio changes. The mechanism is initially set up by adjusting the cable length, such as by a screw end fitting, and by setting various stops. Considerable skill and care is necessary to achieve precise alignment and periodic adjustment is usually required. The cable can bind in its guide tube due to corrosion or dirt, and the return spring can stick or fail to move the mechanism properly. The wide range of gear ratios obtained with the derailleur mechanism is very convenient, but it is recognized that constant maintenance is required to sustain proper operation.

SUMMARY OF THE INVENTION

The mechanism described herein is adaptable to the basic chain and sprocket arrangement of the derailleur apparatus and provides positive shift action with precise positioning at each gear ratio. Initial set up is very simple and the mechanism will remain in alignment with a minimum of maintenance.

At the rear wheel, the arrangement of sprockets and chain, with the shift carriage for carrying and tensioning the chain, is substantially conventional. However, the shift carriage is mounted on a bracket which is moved laterally by a helical screw mechanism, to align the chain with each sprocket selectively. The helical screw mechanism has an actuating arm, the end of which moves through a short arc. From the actuating arm, rigid push-pull rods extend to a shift lever mounted on the upper front portion of the bicycle frame, accessible to the rider. The shift lever is held by detents at several positions, corresponding to the available gear ratios. Through the rigid linkage the shift carriage is precisely positioned in alignment with a selected sprocket at each detented position of the shift lever. Shifting is positive in either direction without the use of springs. In fact the only spring necessary is that used on the shift carriage to tension the chain, whereas the conventional derailleur mechanism may use as many as five springs. The push-pull rod linkage requires no enclosed guides and the only maintenance required is periodic cleaning and lubrication of the hinged links. Initial set up can be made by adjusting the linkage rod length, such as by a single screw threaded end connector.

The primary object of this invention, therefore, is to provide a new and improved positive shift derailleur mechanism for a bicycle.

Another object of this invention is to provide a derailleur mechanism having a push-pull actuating linkage which has positive positioning action in either direction.

Another object of this invention is to provide a derailleur mechanism having gear ratio indexing means at the actuating or shift lever.

A further object of this invention is to provide a positive shift mechanism which is adaptable to existing types of derailleur installations.

Other objects and advantages will be apparent in the following detailed description, taken in conjunction with the accompanying drawing, in which.

DESCRIPTION OF THE PREFERRED EMBODIMENT

Figure 1:
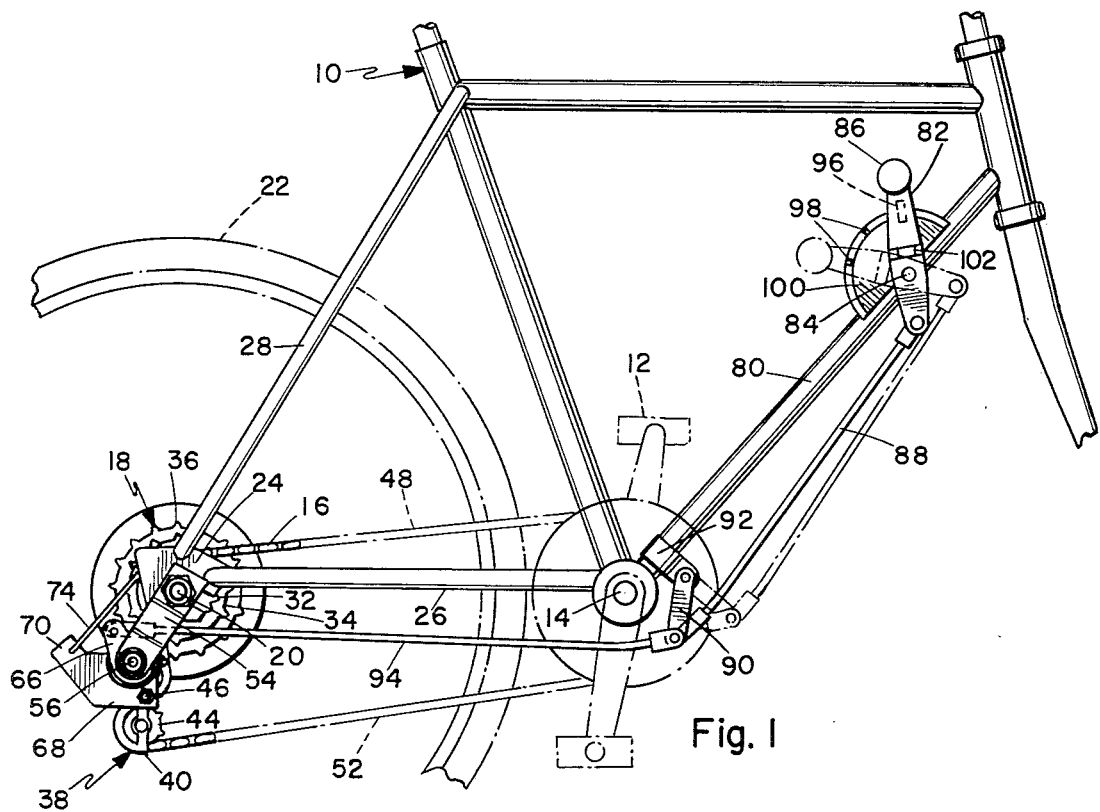
FIG. 1 is a side elevation view of a portion of a bicycle, with the positive shift derailleur mechanism installed.

The bicycle frame 10 illustrated in FIG. 1 is of conventional type and has a pedal assembly 12 on a shaft 14, with a chain 16 extending to the rear sprocket assembly 18 on the axle 20 of rear wheel 22. The axle 20 is held in bearing plates 24, supported on rear fork members 26 and 28, and is secured by the usual nuts 30. Sprocket assembly 18, as illustrated, includes three coaxial sprockets 32, 34 and 36 of different sizes. Some derailleur mechanisms have five sprockets at the rear wheel and the pedal assembly may also have more than one sprocket to increase the number of available gear ratios, the arrangement and operation being well known. The improved shift mechanism is adaptable to any of these installations.

The other portion of the conventional mechanism which is retained is the shift carriage 38, which comprises a generally S shaped frame 40 carrying an idler sprocket 42 and a coplanar tensioning sprocket 44 at the opposite ends. The frame 40 pivots about a shaft 46 through the center of the frame. Chain 16 extends downwardly from the sprocket assembly 18, passes over idler sprocket 42 and tensioning sprocket 44 in an S-shaped path, then extends forward to the pedal assembly. Driving power is applied through the upper reach 48 of chain 16, and the frame 40 is biased by a torsion spring 50 to maintain tension in the lower reach 52 of the chain. Normally the shift carriage 38 is moved along the axis of shaft 46 by a cable and spring arrangement to align chain 16 with any one of the sprockets on the rear axle.

In the improved structure shown the shift mechanism is mounted on a bracket 54, which is secuted at one end to the rear axle 20 by the existing nut 30. Bracket 54 extends outwardly and downwardly, and at the lower end is a post 56 projecting inwardly toward the rear wheel. Post 56 has a steeply pitched helical thread 58 and mounted on the post is a sleeve 60, internally threaded to engage thread 58. Sleeve 60 has an external helical thread 62 pitched opposite to thread 58. Mounted on sleeve 60 is a barrel 64, internally threaded to engage thread 62. Fixed to sleeve 60 is a radially extending actuating arm 66, by which the sleeve can be rotated.

Fixed on barrel 64 is a mounting plate 68, which extends downwardly and has a rearwardly projecting arm 70. The shift carriage 38 is attached to the mounting plate 68 below barrel 64 by means of shaft 46, and is secured by a nut 72. Torsion spring 50 is connected between the mounting plate 68 and frame 40 to bias the shift carriage as described above. The barrel 64 is prevented from rotating by a tie rod 74 pivotally connected between arm 70 and a lug 76 on bearing plate 24.

On the upper portion of the front diagonal member 80 of frame 10 is a shift lever 82 pivotally mounted on a pin 84 and having a handle 86 on the upper end. A rigid actuating rod 88 is pivotally attached at one end to the lower end of shift lever 82, the other end of the actuating rod being pivotally connected to a coupling arm 90. The coupling arm is pivotally mounted on a bracket 92 fixed on the lower portion of diagonal member 80. A second actuating rod 94 is pivotally connected between coupling arm 90 and the actuating arm 66 on sleeve 60. Thus the shift lever 82 is connected by push-pull linkage to the shift mechanism.

Shift lever 82 has a detent 96 which is selectively engageable in spaced notches 98 in an indexing plate 100, fixed on diagonal member 80. The shift lever may be resilient, have a resilient portion, or have a hinge 102 as shown, with suitable spring biasing, not shown, to allow easy shifting of the lever between notches. Other indexing means may be used to provide positive stop positions for the shift lever.

Figures 2, 3, 4:
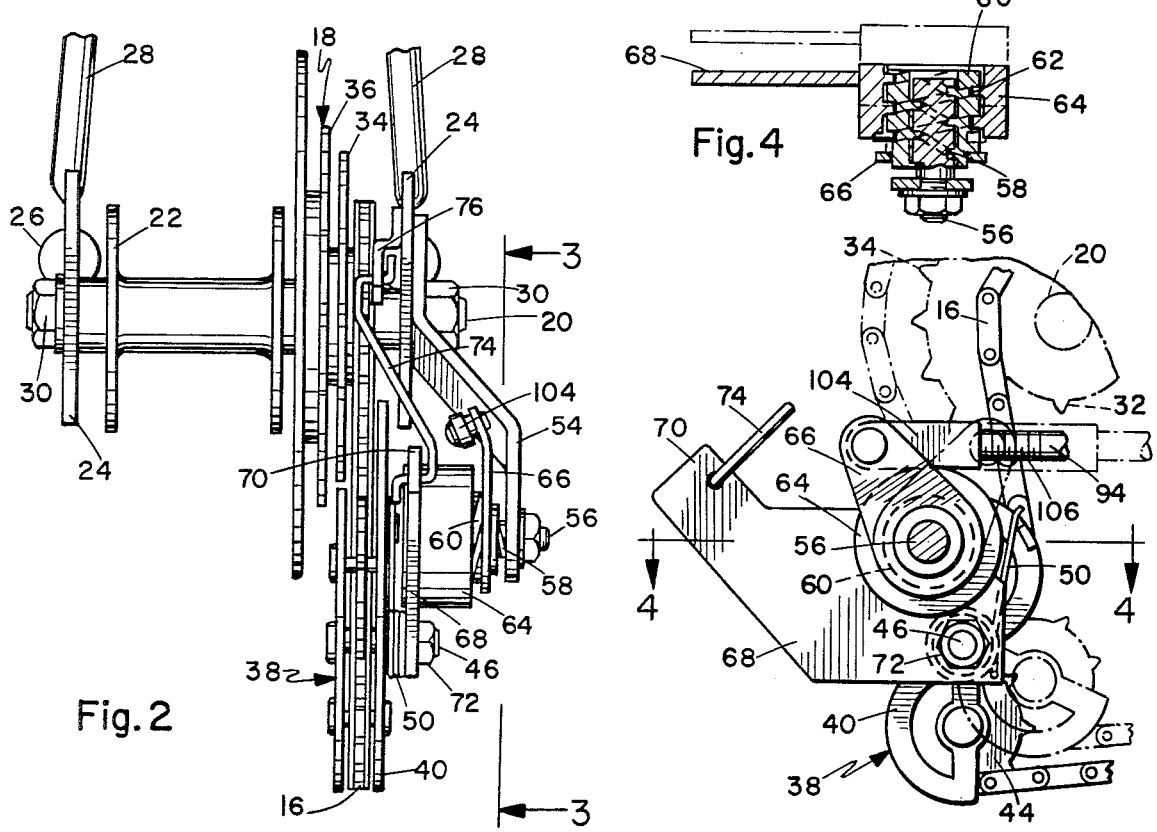
FIG. 2 is an enlarged rear elevation view of the rear wheel drive and shift mechanism.
FIG. 3 is a sectional view taken on line 3—3 of FIG. 2.
FIG. 4 is a sectional view taken on line 4—4 of FIG. 3.

In the full line positions in the drawing, the mechanism is in the highest gear ratio. That is, the chain 16 is on the smallest sprocket 32, shift carriage 38 is at its outermost position and shift lever 82 is forward. To move the mechanism to low gear, shift lever 82 is pulled back to the rearmost notch 98, as in the broken line position in FIG. 1. This action, through the actuating rod linkage, rotates actuating arm 66 forward, as indicated in broken line in FIG. 3. The resultant rotation of sleeve 60 causes the sleeve to move axially on the threads 58 of post 56 and the barrel 64 to move axially on threads 62 of the sleeve, as in FIG. 4. By pitching the threads in opposite direction the axial displacement of the barrel 64 relative to post 56 is amplified. This provides a large axial movement of the barrel for a small rotary motion of sleeve 60, without requiring a helical thread of very steep pitch which would be subject to binding.

The shift carriage 38, which is carried on the barrel 64, is thus shifted inwardly to bring chain 16 into alignment with the large sprocket 36. As the sprockets rotate the chain will be picked up by sprocket 36 with the conventional derailleur action, so shifting the drive to low gear. With the detent notches 98 properly positioned in relation to the axial motion of barrel 64, the chain will always be accurately aligned with the sprocket for the selected gear ratio.

Initial alignment or set-up of the mechanism is easily accomplished by adjusting the length of the actuating rod linkage. As illustrated, the coupler 104 connecting the linkage to actuating arm 66 is adjustable on the threaded rear end 106 of actuating rod 94. Provision for adjustment could be made elsewhere in the linkage, to suit a particular installation.

With the rigid push-pull linkage the rider can move the shift lever to the selected detent position and know that the chain will transfer properly to the selected sprocket. This greatly reduces strain and wear on the mechanism and makes shifting a simpler and quicker operation.

Having described my invention, I claim:

1. In a bicycle having a frame, a rear wheel with an axle mounted in said frame, a plurality of drive sprockets of different sizes coaxially mounted on said rear axle, a pedal actuated drive chain engaging one of said drive sprockets, a shift carriage having an idler sprocket and a coplanar tensioning sprocket on which said chain is retained, said idler sprocket having a shaft on which said shift carriage is pivotal, the improvement comprising:

a mounting plate to which said idler sprocket shaft is secured;

shift means including a post fixed on said frame with an axis parallel to the rear wheel axis;

a barrel coaxial with said post, said mounting plate being fixed to said barrel;

a sleeve rotatably mounted on said post and within said barrel, said sleeve having a radially extending arm;

said post and said sleeve having a helically threaded interconnection pitched in one direction, and said sleeve and said barrel having a helically threaded interconnection pitched in the other direction;

means connected between said barrel and said frame to hold the barrel against rotation;

a shift lever adjustably mounted on said frame; and rigid push-pull linkage connecting said shift lever to said radial arm to rotate said sleeve and move said idler sprocket axially into alignment with each of said drive sprockets selectively.

* * * * *